US010387643B2

(12) United States Patent
Bendel et al.

(10) Patent No.: US 10,387,643 B2
(45) Date of Patent: *Aug. 20, 2019

(54) SECURE INVOCATION OF STORED PROCEDURES IN DATABASE MANAGEMENT SYSTEMS

(71) Applicant: International Business Machines Corporation, Armonk, NY (US)

(72) Inventors: Peter Bendel, Holzgerlingen (DE); Nicole Y. Finnie, Boeblingen (DE); Claus Kempfert, Altdorf (DE); Knut Stolze, Hummelshain (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/050,172

(22) Filed: Jul. 31, 2018

(65) Prior Publication Data

US 2018/0365413 A1 Dec. 20, 2018

Related U.S. Application Data

(63) Continuation of application No. 14/951,936, filed on Nov. 25, 2015, now Pat. No. 10,095,861.

(30) Foreign Application Priority Data

Sep. 25, 2015 (GB) .................................. 1517003.8

(51) Int. Cl.
*H04L 9/00* (2006.01)
*G06F 21/53* (2013.01)
(Continued)

(52) U.S. Cl.
CPC ............ *G06F 21/53* (2013.01); *G06F 16/178* (2019.01); *G06F 16/2443* (2019.01);
(Continued)

(58) Field of Classification Search
CPC .... G06F 21/53; G06F 21/629; G06F 21/6227; G06F 21/6218; G06F 17/30415; G06F 17/30174
See application file for complete search history.

(56) References Cited

U.S. PATENT DOCUMENTS 10,095,861 B2 * 10/2018 Bendel .............. G06F 17/30174
2017/0091446 A1 3/2017 Bendel et al.

OTHER PUBLICATIONS

List of IBM Patents or Patent Applications Treated as Related; (Appendix P), Filed Jul. 31, 2018; 2 pages.
(Continued)

*Primary Examiner* — Beemnet W Dada
(74) *Attorney, Agent, or Firm* — Cantor Colburn LLP; Robert Bunker

(57) ABSTRACT

Securing invocation of stored procedures is provided herein. A first database management system (DBMS) can include a first database with first tables, a first user management module configured to manage privileges of database users (DB-users) of the first DBMS, and at least one first stored procedure. A second DBMS can include a second database with second tables, a second user management module configured to manage privileges of DB-users of the second DBMS, and at least one second stored procedure, the at least one second stored procedure configured to perform a computational task in the second DBMS. A synchronization mapping can map at least a portion of the first tables to respective ones of the second tables. Thus, a transfer of data of at least some of the first tables to the respective ones of the second tables in accordance with the synchronization-mapping can be performed.

20 Claims, 3 Drawing Sheets

(51) Int. Cl.
*G06F 16/178* (2019.01)
*G06F 16/242* (2019.01)
*G06F 21/62* (2013.01)

(52) U.S. Cl.
CPC ........ *G06F 21/629* (2013.01); *G06F 21/6218* (2013.01); *G06F 21/6227* (2013.01); *G06F 2221/034* (2013.01)

(56) References Cited

OTHER PUBLICATIONS

Peter Bendel et al., "Secure Invocation of Stored Procedures in Database Management Systems ", U.S. Appl. No. 16/050,209, filed Jul. 31, 2018.

* cited by examiner

SECURE INVOCATION OF STORED PROCEDURES IN DATABASE MANAGEMENT SYSTEMS

This application is a continuation of U.S. application Ser. No. 14/951,936, filed on Nov. 25, 2015, which claims priority to United Kingdom Application No. 1517003.8 filed on Sep. 25, 2015 and all the benefits accruing therefrom under 35 U.S.C. § 119, the contents of which in its entirety are herein incorporate d by reference.

BACKGROUND

Embodiments herein relate to database management systems, and more specifically, to database management systems comprising stored procedures.

The capability to manage large data volumes and online transactional processing (OLTP), as well as online analytical processing (OLAP) queries to be performed on said data volumes, has become an important aspect for data warehouse design. Often, OLTP queries perform better on database tables of a particular structure that are unsuited for efficiently performing OLAP queries and vice versa. However, having diversity with respect to different kinds of database queries requiring different data structures creates efficiency problems for managing the large data volumes, OLTP, and OLAP queries.

SUMMARY

Described herein is a system including a first database management system (DBMS), a second DBMS, and a synchronization mapping. The first DBMS includes a first database with a plurality of first tables, a first user management module configured to manage and check privileges of database users (DB-users) of the first DBMS, and at least one first stored procedure. The second DBMS includes a second database with a plurality of second tables, a second user management module configured to manage and check privileges of DB-users of the second DBMS, and at least one second stored procedure, the at least one second stored procedure configured to perform a computational task in the second DBMS. The synchronization mapping is configured to map at least a portion of the first tables to respective ones of the second tables. The system is configured for transferring data of at least some of the first tables to the respective ones of the second tables in accordance with the synchronization-mapping. The above system can be implemented in a method and/or computer program product.

Additional features and advantages are realized through the techniques of the present disclosure. Other embodiments and aspects of the disclosure are described in detail herein. For a better understanding of the disclosure with the advantages and the features, refer to the description and to the drawings

BRIEF DESCRIPTION OF THE DRAWINGS

In the following, embodiments are explained in greater detail, by way of example only, making reference to the drawings in which.

DETAILED DESCRIPTION

To overcome the problems associated with different kinds of database queries requiring different data structures, systems have been developed which comprise two or more database management systems (DMBSs) with differently structured database tables. The data of one of said databases is—partially or completely—synchronized with the data of the one or more other databases of the system. In such systems, there may exist queries which can be performed more quickly on the source DBMS while other queries can be performed more quickly on one of the other DBMS of the system.

Embodiments herein include various advantages. For example, a client may not need to "know" in which one of the DBMS a particular query has the minimum execution time to direct the query to the appropriate DBMS or may need to "know" in which one of the DBMSs of the system a respective stored procedure is implemented for calling said stored procedure. Thus, a tight coupling of client and database server can be avoided and maintenance costs can be reduced.

In a further beneficial aspect of an embodiment, dynamically dispatching a query from one DBMS of the system to the other may be possible also for complex queries and in cases in which the table structure and database-internal functions of the first and second DBMS differ.

In a further beneficial aspect of an embodiment, the data management system may support executing complex database queries which may not be limited to predefined database queries known to be "safe".

In a further beneficial aspect of an embodiment, a data management system being protected against attacks based on SQL injection may be provided.

In a further beneficial aspect of an embodiment, a secure environment for executing third-party stored procedures for performing a data analysis task can be provided.

Figure 1:
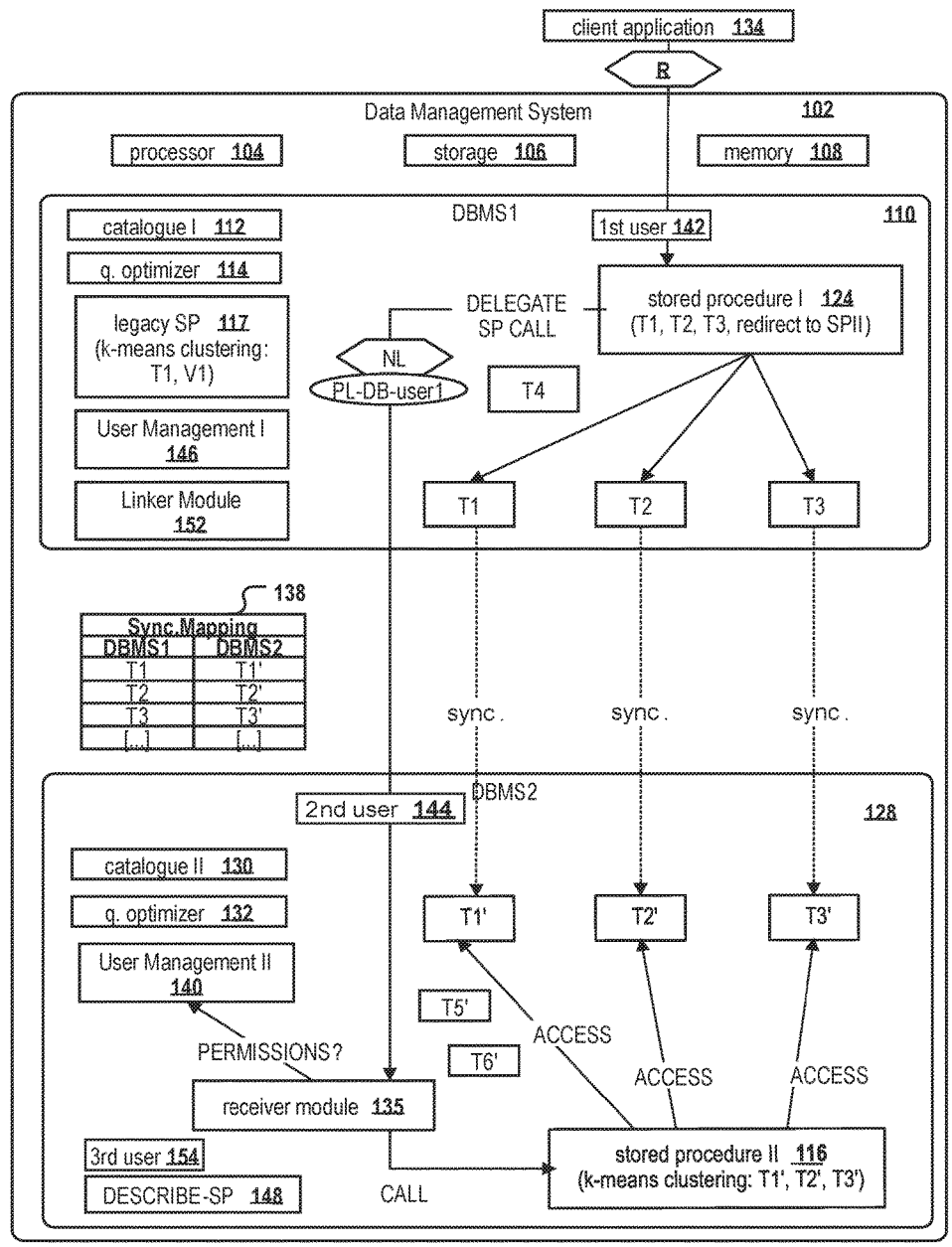
FIG. 1 depicts a system for secure invocation of stored procedures according to an embodiment.

FIG. 1 depicts a system 102 comprising a synchronization mapping 138, a first DBMS 110 and a second DBMS 128. The system 102 and its components can be configured for executing a method according to an embodiment as depicted, for example, in FIG. 3. The system 102 may comprise a one or more processors 104 for performing instructions which encode the method for secure stored procedure execution according to an embodiment. The instructions can be stored in a memory 108 of the system and/or in a non-volatile storage medium 106.

The first DBMS 110 comprises a first database with a plurality of first tables T1, T2, T3, a first user management module 146 for managing and checking privileges of DB-users of the first DBMS, and at least one first stored procedure 124. The second DBMS comprises a second database with a plurality of second tables T1'-T3', T5', T6', a second user management module 140 for managing and checking privileges of DB-users 144 of the second DBMS, and at least one second stored procedure 116. The second stored procedure is configured for performing the computational task in the second DBMS.

The synchronization mapping can be implemented, for example, as a database table, a configuration file or a service operatively coupled to the data management system 102. It may comprise a 1:1 assignment of first and second tables. For example, first table T1 is mapped to second table T1', first table T2 is mapped to second table T2', etc. The mapping indicates that the data content in a first table is completely or partially copied to the respectively mapped second table, e.g. by a regularly executed synchronization or data replication process. In some embodiments, the mapping of first tables to second tables can be a 1:n or a n:1 relationship. According to some embodiments, the synchronization mapping is contained in the database catalogue 112 of the first DBMS. The data synchronization is indicated in FIG. 1 by dotted arrows. The first and/or the second DBMS may comprise unmapped tables T4, T5', T6'.

According to some embodiments, the first DBMS and the second DBMS and/or a receiver module operatively coupled to the second DBMS have access to the synchronization mapping. In other embodiments, the content of the synchronization mapping is completely or partially copied and the second DBMS and/or the receiver module have access to said copy. The copy can be regularly synchronized with the original synchronization mapping. The synchronization-mapping maps at least some of the first tables to respective ones of the second tables. The data management system 102 is configured for transferring data of at least some of the first tables to respective ones of the second tables in accordance with the synchronization-mapping.

Figure 3:
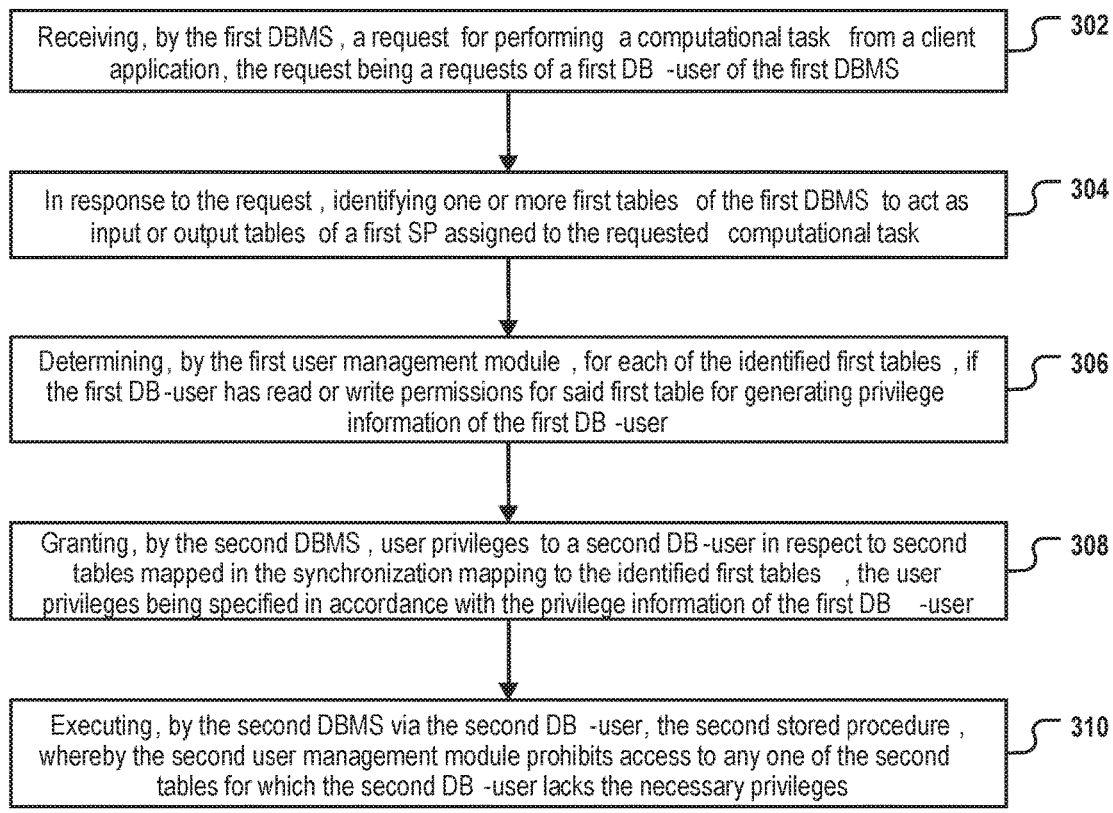
FIG. 3 depicts a process flow according to another embodiment.

The system is configured for performing the method depicted in FIG. 3: In step 302, the first DBMS receives a request R for performing procedure computational task. For example, the task could be an OLAP analytical task that can be performed more efficiently based on the table structure of the second DBMS than on the table structure of the first DBMS. The request is received from a client application 134 running e.g. on a desktop computer, notebook, mobile phone or other data processing device. The request is specified in the form of a requests of a first DB-user of the first DBMS or is specified in the form of a request to a software application (not shown) operatively coupled to the system 102, whereby the software application is configured to transform the original request R, e.g. a remote procedure call or a web service call, to a request of a first DB-user of the first DBMS. The request R may comprise names of a plurality of first tables to act as input or output tables for performing the computational task (and thus comprises first table names of the first DBMS that comprise the relevant input data or that should be used as containers for storing intermediate and final results). Upon the receipt of the request, a first stored procedure assigned to the requested computational task is identified and called, whereby the first table names of the request are provided as arguments to the first stored procedure.

The first stored procedure can be a stored procedure specific for the requested computational task and comprising a specification which tables whose names are received as arguments are to be used as input tables or output tables. In this case, said first stored procedure is specifically assigned to a specific, individual computational task.

Alternatively, the first stored procedure can be a stub stored procedure that is assigned dynamically with any of a plurality of computational tasks supported by the data management system upon receiving the request. Thus, said first stored procedure can be assigned to the received request and the requested computational task dynamically at the moment of receiving the request.

In step 304, the first and/or the second DBMS or component(s) thereof identify, in response to receiving the request, one or more of the first tables to act as input or output tables for the first stored procedure. For example, the first or the second DBMS may evaluate and parse the first request and its parameters as well as the first stored procedure 124 called by the request R.

In step 306, the first user management module 146 of the first DBMS 110 determines, for each of the identified first tables, if the first DB-user has read or write permissions for said first table for generating privilege information of the first DB-user.

In step 308, the second DBMS specifies user privileges of a second DB-user in respect to second tables mapped in the synchronization mapping to the identified first tables. The user privileges are specified in accordance with the privilege information of the first DB-user. This means that the second DB-user will be assigned the same privileges in respect to a particular second table (in DBMS2) as the first DB-user has in respect to a first table (in DBMS1) which is mapped in the synchronization mapping to said particular second table.

In step 310, the second DBMS executes, via (i.e., by using/under the account of) the second DB-user, the second stored procedure 116. The second user management module 140 prohibits access to any one of the second tables for which the second DB-user lacks the necessary privileges.

Said features of the system and corresponding method can be advantageous for multiple reasons:

By dispatching the execution of a computational task, in particular a data analysis task, from the first DBMS to the second DBMS, the computational load of the first DBMS can be reduced. This is particularly advantageous if the first DBMS is optimized for different kinds of statements than the second DBMS. For example, the first DBMS could be an OLTP system optimized for OLTP statements, the second DBMS could be optimized for analytical (OLAP) statements. Thus, computational resources of the system hosting the first DBMS can be mainly or completely used for processing database statements that can be processed efficiently in the first DBMS. The second DBMS can be an OLAP system and the table structure of the second DBMS can be specially optimized for performing analytical queries efficiently. According to other examples, the first DBMS could be a DB2 z/OS database lacking some suitable stored procedures to perform a particular computational task while the second DBMS, e.g. DB2 LUW, could comprise appropriate stored procedures. In this case, adding some appropriate stub first procedures to the DB2 z/OS database which may, for example, only some statements for logging, tracking and framework-integration purposes, some ("declarative") SQL statements for dynamically resolving received input and output table names and a command for triggering execution of a corresponding second stored procedure in the DB2 LUW database (DBMS2) can be used. Thus, by dispatching the execution of a computational task, in particular an analytical computational task, the total time necessary for performing the analysis can be reduced.

The dispatching according to an embodiment is performed in a highly flexible and at the same time secure manner:

The first DBMS may not "know" and may not be able to control what kind of second stored procedure is stored in the second DBMS. The second DBMS may comprise a plurality of stored procedure, potentially provided by different vendors and related to different computational tasks, e.g. various complex clustering algorithms. Thus, there is an inherent risk that the second stored procedure comprises malicious code or comprises bugs and errors which can be a security thread. For example, the stored procedures may not be protected against SQL injection.

As the second table names used as input or output tables for the second stored procedure are determined dynamically, a great flexibility is provided in respect to the set of first (and thus also second) tables dynamically selected to act as input or output tables. However, this flexibility may inherently bear the risk that the second DBMS is attacked by malicious could introduced via SQL injection and which can be directed at second tables which are not mapped to one of the first tables requested to act as input or output tables. A successful attack via SQL injection could result in the deletion of data contained in one of the second tables, in the disclosure of the structure of said second tables enabling an attacker to design further attacks, or could allow the attacker to spy on confidential data.

Said security risks can be prevented by executing the second stored procedure under a second DB-user whose privileges are dynamically derived both from the (trusted) synchronization mapping 138 and from the privileges of a first DB user managed by the first DBMS in respect to first table name whose names are specified in the request R and/or in the first stored procedure 124. Said mapping and the privilege information of the first DB-user can be controllable by an operator of the first DBMS more easily and thus can be considered as safe. In particular in case the second DBMS or the second stored procedure is provided as a kind of "plug-in" second DBMS to improve the analytic capabilities of the first DBMS, a user of the first DBMS may not be able or willing to inspect the individual components and stored procedures of the second DBMS. By providing a second DBMS whose user and privilege management is tightly coupled to the mapping information 138 and the privileges information of the first DB-user, a user of the first DBMS may make use of the "accelerator" DBMS2 without risking that data replicated from the first DBMS to the accelerator DBMS is leaked or manipulated by a malicious or erroneous second stored procedure.

Thus, although the first DBMS may not "know" what the second stored procedure actually does under the hood, by using a second DBMS whose user privilege management is implemented according to embodiments herein, the second stored procedure can be prevented from accessing second tables that should not or need not be accessed for performing the requested computational task.

Optionally, the first DBMS may comprise further components such as a query optimizer 114 for optimizing the execution plan of database queries performed in the first DBMS or a legacy stored procedure 117. The legacy stored procedure may comprise database queries and code for performing a particular computational task, e.g. the k-means clustering algorithm, on first tables in the first DBMS. Said legacy stored procedure 117 may have been replaced by or supplemented with the first stored procedure 124, e.g. by renaming the legacy stored procedure and storing the first stored procedure 124 under the original name of the legacy stored procedure in the first DBMS.

The first stored procedure can be a first SP that is dynamically assigned to one out of a plurality of second stored procedure upon being called by the request R of the client application. For example, the request R may comprise an ID of the second SP and the computational task it implements (task-ID) and the first SP may comprise a call statement to a second SP whose name or ID is dynamically identified by the task-ID provided by the request as input parameter of the first SP. A first SP may comprise multiple "declarative" statements some of which have the function of triggering the resolution of names of tables of the first DBMS which are to be used as input or output tables to names and functions implemented in ("known to") the second DBMS. Such "declarative" statements mainly or merely have the function of feature resolution for enabling the dispatching of the task to the second DBMS. In addition, a first SP may comprise further statements which implement logging and tracing steps in the context of dispatching the requested computational task and which may link the dispatching process to framework modules and libraries installed in the first and second DBMS to support the dispatching of the task. Said statements are usually related to but are not part of or directly contribute to the requested computational task. Thus, some forms of first stored procedure mainly consist of such "declarative" statements and task-related statements for enabling task dispatching and logging.

According to other embodiments, the specification of the first stored procedure may comprise a list of generic, "declarative" SQL statements triggering the resolution of the view and table names received as parameters by the first stored procedure in a way that both the first and the second DBMS "know" which input or output data containers (tables or views) are specified by said arguments. For example, the first stored procedure may comprise DESCRIBE statements to be executed on the input arguments provided by the request upon calling the first stored procedure. The execution of said DESCRIBE statements is performed by the first DBMS to parse the parameter values of the request R (which may have a proprietary syntax) into a syntax interpretable by the first DBMS for allowing the first DBMS to identify the input and output table names of the first DBMS provided to the first SP and for allowing the second DBMS to identify the input and output table names of the second DBMS provided to the second SP. The first SP may comprise further ("declarative") statements for resolving the table names of the first tables in DBMS1 to the names of mapped tables in DBMS2 and/or for checking if the requesting client has the necessary user privileges.

After all received input table names were successfully resolved by the first stored procedure to table names in DBMS2, said single first stored procedure triggers the execution of the particular one of one or more second stored procedures in DBMS2 which implements the computational task. Using a single first stored procedure for resolving the input and output table names for a plurality of different computational tasks and corresponding second stored procedures can be advantageous as it reduces the resource consumption and maintenance costs in the first DBMS. For example, it is not necessary to store and maintain a plurality of first stored procedures in the first DBMS and keep it in sync with the number and type of computational tasks implemented in DBMS2 in form of respective second stored procedures.

According to some other embodiments, the first stored procedure has statically assigned a particular computational task ("special purpose first stored procedure(s)"), e.g. the computational task originally implemented by the legacy stored procedure. The first stored procedure may implement the computational task in the context of DBMS1, e.g. comprise SQL statements for performing the computational task on first tables in DBMS1. In addition, the first stored procedure may comprise special purpose statements which trigger a table and view name and optionally also an UDF resolution process for providing basic SQL statements interpretable by the second DBMS which specify second input and output tables mapped to the input and output tables of the first DBMS, thereby allowing the dispatching of the computational task to the second DBMS. The first stored procedure can be statically mapped to a respective second stored procedure configured to perform said computational task on second database tables in the second DBMS, whereby the names of the second tables acting as input and output tables can be provided to the second stored procedure dynamically. Such a "special purpose" first SP can be enabled, e.g. by means of a particular input argument, to dynamically switch between executing the task in DBMS1 or delegate it to DBMS2.

The "special purpose" or the "generic" first stored procedure can be integrated into DBMS1, for example, by providing a module, referred herein as "linker module" which comprises the first stored procedure. The linker module is configured to communicate with a receiver module, whereby the receiver module is implemented as an integral module or plugin of the DBMS2 or as an application program being interoperable with DBMS2. The receiver module is configured for receiving query statements comprising the rewritten and optionally labeled query statements from the first stored procedure and is configured to call the second stored procedure implementing the requested computational task. The linker module is capable of causing the DBMS1 to execute some SQL statements, e.g. for checking privileges of the requesting user or client application in respect to the first tables provided as arguments in the request R. For example, the linker module may cause DBMS1 to execute "SELECT * from table T1 WHERE . . . " to determine if the first DB-user is allowed to access table T1. In some embodiments, the linker module enables the DBMS1 to initiate a communication link with the receiver module and to exchange information, e.g. the resolved table name list and corresponding privilege information, via the communication link. The receiver module may use this information as argument when calling one of the second stored procedures to be executed in DBMS2.

For example, in case the first DBMS receives the request R from a client device or a client application, the first DBMS may forward the request and its parameter value to the linker module. According to embodiments, the linker module comprises metadata indicating which ones of the second stored procedures implements the requested computational task and can be configured to create a communication connection between the first DBMS and the receiver module. According to embodiments, the linker module is able to provide an identifier of the second stored procedure to the first stored procedure to enable the first stored procedure to call the second stored procedure if all first input and output data containers could successfully be resolved to container names in the second DBMS.

The one or more second stored procedures can be stored in the second DBMS e.g. by loading, by the second DBMS, a module being specific for a computational task (e.g. k-means clustering) or a set of computational tasks (e.g. a set of different clustering algorithms), whereby each computational tasks is implemented in the form of a respective second stored procedure. The module can be provided by a particular vendor and the second DBMS may load the task-related modules of multiple vendors. In other implementation variants, the definition of some or all second stored procedures in DBMS2 is stored in the catalogue of the second DBMS. For example, a set of clustering-related second SPs of the second DBMS may correspond to a respective clustering-related first SP in DBMS1 and a respective clustering-related DESCRIBE-SP loaded in DBMS1 or DBMS2. Said clustering-related SP1, SP2s and DESCRIBE-SP may all be provided by a vendor of clustering-solutions, whereby the DESCRIBE-SP can be configured for parsing and normalizing the syntax of clustering-related requests R provided in a vendor-specific syntax.

Another set of finance-related second SPs of the second DBMS may correspond to a respective finance-related first SP in DBMS1 and a respective finance-related DESCRIBE-SP loaded in DBMS1 or DBMS2. Said finance-related SP1, SP2s and DESCRIBE-SP may all be provided by a vendor of finance-analysis-solutions, whereby the DESCRIBE-SP can be configured for parsing and normalizing the syntax of finance-related requests R provided in a vendor-specific syntax.

The data management system can be accessible to a plurality of client devices via a network, e.g. the internet. In some embodiments, the first and second DBMS are run on the same data processing machine, e.g. a database server machine. In other embodiments, the first and second DBMS are run on different data processing machines, e.g. two different database server machines respectively comprising one or more processors, memory and a data storage medium.

Likewise, the second DBMS may comprise further components such as a query optimizer 132 for optimizing the execution plan of database queries performed in the second DBMS or a catalogue 130 comprising e.g. structural definitions, names and constraints of the second tables T1', T2', T3', T5', T6'.

According to some embodiments, the first stored procedure triggers the generation of the privilege information of the first DB-user by the first user management module in response to the first DBMS receiving of the request R from the client device 134. In some embodiments, also the second DB-user is created in the second DBMS in response to the first DBMS receiving the request R for calling the first stored procedure 124.

This can be advantageous, as the dynamic creation of the second DB-user with defined privileges implies that a secure runtime environment is established in the second DBMS for executing the second stored procedure without risking that in case the second SP comprises bugs or malicious routines or is hijacked by SQL injection could access any second table the second SP shall not have access to. In a particular beneficial aspect, an embodiment protect from unauthorized accessing of second tables by the second SP even in case a pre-processing of the second SP before executing it is not possible, e.g. because the SQL statements performed by the second SP are assembled dynamically at runtime of the DBMS2

For example, the first DBMS may receive a request R comprising a list of first table names NL in a vendor-specific syntax. The first DBMS generates, alone or in interoperation with the second DBMS, a list of first table names "name list" NL1 of all first tables acting as input or output tables in a syntax. In addition, the first DBMS may identify, for each of the identified input and output first tables, the access permission of a first DB-user (if any) via which the request R was received. Said READ or WRITE permission or information on the absence of such permission is provided together with a reference of the respective first table to the second DBMS, e.g. in form of a property value privilege list "PL-DB-user1".

According to embodiments, the first DBMS, upon receiving the request, the execution of the first SP triggers the creation of the second DB-user via a receiver module 135 which is an integral part of the second DBMS or is operatively coupled to the second DBMS, e.g. in the form of a plug-in or in the form of an extension installed after the second DBMS was installed.

According to some embodiments, the first user management module 146 generates the privilege information of the first DB-user by looking up a first catalogue 112 of the first DBMS. The first catalogue comprises privilege information of one or more first DB-users in respect to the first tables T1-T4. For example, the first DBMS can be a DB2 DBMS and the first catalogue can be a DB2 catalogue comprising a catalog table for each of the first tables. Performing a catalogue lookup for identifying the privilege information for the first DB-user may have the benefit that a catalog lookup can typically performed very fast, usually within fractions of a second.

According to alternative embodiments, the first user management module 146 generates the privilege information of the first DB-user by performing, via the first DB-user, a test query to each of the identified first tables to determine if the test query causes an error message or not. If an error is thrown when accessing a particular first table via the account of the first DB-user, and if the error code indicates that the error was caused by a lack of privileges (and not e.g. by the absence of the first table in the first DBMS), the first user management modules determines that said first DB-user lacks the necessary privileges to access said first table.

This approach can be beneficial as it is and can be implemented in any kind of DBMS: This approach does not require an explicit interface to the user management module or catalog of the first DBMS. So it does not need a special implementation but can be exploited generically. The only prerequisite for this approach is that the DBMS returns a specific error for queries if the user is not authorized.

For example, this privilege check could be implemented in the first stored procedure or in the linker module of the first DBMS. The privilege check could comprise sequentially accessing all first tables specified as input or output tables in the first SP via the first DB-user for identifying the privileges of said first DB-user even in case the type of DBMS used as the first DBMS does not comprise a catalogue-based user management. For example, the first SP, the linker module or other module contained in or otherwise operatively coupled to the first DBMS may execute a predefined test query on said first tables via the first DB-user, thereby triggering the first user management module 146 to check if the first DB-user has all necessary privileges. This approach can be particularly suited in case of a complex privileges structure including multiple user-groups and subgroups because accessing the catalogue of the first DBMS—even if it is available to the first SP or the linker module—can be too complicated and computationally demanding.

For example, the test query can be performed as an EXPLAIN query on a first table. This may have the advantage that EXPLAIN queries are typically fast. An EXPLAIN query is a DBMS-provided command that obtains information about access path selection for an explainable statement. An explainable statement is an SQL or XQuery statement for which an explain operation can be performed. In DB2, for example, explainable SQL or XQuery statements are: DELETE; INSERT; MERGE; REFRESH TABLE; SELECT; SET INTEGRITY; UPDATE; VALUES.

According to embodiments, the synchronization-mapping comprises a 1:1, 1:n or n:1 mapping of first and second tables.

In some embodiments, the synchronization mapping is part of the first catalogue 112. In other embodiments, the synchronization mapping can be part of the second DBMS or can be external to both DBMS but operatively coupled to both the first and the second DBMS e.g. via a network connection.

According to some embodiments, the method further comprises: communicating the determined privilege information of the first DB-user to the second DBMS; identifying, by the first or second DBMS, one or more of the second tables mapped in the synchronization mapping to one of the identified first tables, the identified second tables acting as input or output tables for the second stored procedure; and in response to receiving the privilege information, creating, by the second user management module, the second DB-user as a user of the second DBMS.

The specification of the user privileges of the second DB-user comprises assigning, by the second user management module, to the second DB-user the same access privileges for each of the identified second tables which are granted to the first DB-user in respect to the one of the identified first tables to which said second table is mapped in the synchronization-mapping.

For example, in an embodiment, the receiver module is configured for receiving the privilege information of the first DB-user and is configured for, in response to receiving a list of names of the one or more first tables identified as input or output tables for the computational task, for:

triggering the second DBMS to grant the user privileges of the second DB-user in accordance with the received privilege information of the first DB-user; and/or performing the identification of the one or more of the second tables mapped in the synchronization mapping to the identified first tables or triggering the first or second DBMS to perform said identification of the one or more second tables mapped in the synchronization mapping to the identified first tables; and/or triggering the second DBMS execute the second stored procedure via the second DB-user.

This can be advantageous as the second stored procedure is prohibited from reading or manipulating any data the client device (and the respective first DB-user) is not allowed to see or manipulate.

According to embodiments, the second DB-user is deleted upon aborting or successfully terminating the execution of the second stored procedure. This can be advantageous as the number of second-DB-users created in response to a request of a client is limited, thereby preventing the user management in the second DBMS to consume more time and computational resources for managing thousands of second DB-users. According to embodiments, the deletion of the second DB-user is triggered by the receiver module which may have called the second stored procedure and receive a result set or an error message indicating if and when the second stored procedure terminated, thereby making the second DB-user obsolete.

According to embodiments, the second user management module 140 assigns access privileges to the second DB-user in respect to any one of the identified second tables, the access privileges are confined to SELECT privileges in case the access privileges of the first DB-user in respect to the one of the first tables to which said identified second table is mapped in the synchronization-mapping is confined to SELECT privileges. Thus, by assigning SELECT-only access privileges, WRITE operations (e.g. UPDATE, INSERT, DROP or DELETE statements) to a particular second table or view by the second DB-user can be prohibited.

Analogously, in case the access privileges of the first DB-user in respect to the one of the first tables to which said identified second table is mapped in the synchronization-mapping is an INSERT, UPDATE, DELETE or DROP privilege, the second user management module 140 assigns INSERT, UPDATE, DELETE or DROP privileges to the second DB-user in respect to said identified second tables. Thus, a highly fine granular privilege management method can be provided.

According to embodiments, the second DBMS prohibits any external system or client application from directly calling or requesting the execution of the second stored procedure in the second DBMS. Only the first DBMS is allowed to trigger the execution of the second stored procedure as described herein for an embodiment. This may further increase the security by prohibiting any external system from calling a second stored procedure that may comprise erroneous or malicious code.

According to embodiments, the second user management module 140 of the second DBMS does not have access to the user privilege information of the first DB-user unless the privilege information of the first user is communicated by the first DBMS to the second DBMS in response to the first DBMS receiving the request R from the client application 134. In other words, the privilege information of the first DB-user(s) are protected against access by the second DBMS. Only in response to receiving a request R, the first DBMS may actively provide the second DBMS with the required privilege information. This may further increase the security of the system and method.

According to embodiments, the names of the identified first database tables acting as input or output table of the first stored procedure are:
  specified as parameter values of the request R, the parameter values to be used as input parameters for the first procedure; or
  specified in the code of the first procedure.

Also, a combination is possible. For example, the first stored procedure may receive a first set of first table names dynamically from the client device. The first set of first table names may specify the first database tables comprising the data records which shall be clustered in a clustering algorithm. In addition, the first stored procedure may comprise a hard-coded second set of first table names whereby said first tables may comprise, for example, configuration data for various thresholds used for performing the computational task, e.g. for performing the clustering. As the configuration data and respective tables may always be the same for a particular type of clustering algorithm, it may not be necessary to provide this information dynamically.

According to embodiments, the second DBMS comprises a DESCRIBE stored-procedure 148. The DESCRIBE SP is a stored procedure capable of parsing, when executed, parameter values of the received request R to identify the first tables and their role (as input or output containers) for performing the computational task and to provide the parsed information in a syntax interpretable by the first and second DBMS. Implementing the DESCRIBE-functionality in the form of a stored procedure has the advantage that said functionality can be installed easily in any kind of DBMS.

Often, but not necessarily, the DESCRIBE stored procedure is provided by the same vendor as the second stored procedure in preparation of whose execution the DESCRIBE stored procedure is called.

According to an embodiment, the DESCRIBE stored procedure is only called in DBMS2 in preparation of performing the second stored procedure. For example, when the first stored procedure is called upon the first DBMS1 receiving the request R, the receiver module is notified of the receiving of the request. The receiver module triggers the second DBMS to create the second DB-user in the second DBMS to perform the DESCRIBE stored procedure in DBMS2 (before the second DB-user is granted access privileges in accordance with the privilege information of the first DB-user and before the second stored procedure is called). Thus, the second user is created, according to embodiments, in the second DBMS in response to the first DBMS receiving the request R. The created second DB-user performing the DESCRIBE stored procedure lacks permissions for accessing any one of the second tables and is only allowed to call the DESCRIBE-stored procedure of the second DBMS to provide information about structural features of the tables in DBMS2 (the "second tables"). By applying the DESCRIBE stored procedure on the parameter values of the request R, the DESCRIBE procedure provides information on the names and roles of the first tables to be used as input or output containers. For example, the receiver module, upon being notified that the first DBMS received a request for executing the first stored procedure and has resolved the first table names into second table names, creates the second-DB-user with no privilege to read or write any data from or to one of the tables in DBMS2 ("second tables") and calls the DESCRIBE-stored procedure. Thereby, the linker module 152 of DBMS1 provides the request R and its input parameters as input to the called DESCRIBE stored procedure. The provided content and its input parameters specify the names of all first database tables to be used as input or output tables in accordance with a first syntax. The first syntax can be, for example, a stored procedure type specific syntax identifying which ones of the first tables shall act as input or output tables. The called DESCRIBE stored procedure parses the provided content (e.g. the name list NL) for identifying the first tables acting as input or output tables of the first stored procedure. Then, the DESCRIBE stored procedure outputs a list of the identified first table names NL1 and their roles (input or output table) in a syntax. The syntax is interpretable both by the first DBMS as well as by the second DBMS. For example, the DESCRIBE SP parses the table names from the name list NL, validates the table names (syntax) using the SQL standard of DBMS1, converts the table names into a more syntax, e.g. into qualified table names of DBMS1 (having e.g. the standard <schema-name><first-table-name>), and transfers them and their roles as input or output tables in the syntax to the DBMS1. The syntax that can be interpreted at least by the first DBMS or components thereof, e.g. the linker module or the first SP. The transferred first table names and roles enable the first user management module 146 and also some additional modules or plug-ins of the DBMS1 (which may not be specific to the DBMS1) to identify the privilege information of the first DB-user in respect to the identified first tables by parsing the syntax.

Thus, the DESCRIBE SP can be considered as a syntax parser for DBMS1 to enable DBMS1 to understand the request R to ensure that the first DBMS receives input and output table names in a syntax the DBMS1 can interpret for identifying privilege information of the first DB-user for the tables in NL1 and for resolving first table names to mapped second table names. Thus, the DESCRIBE-SP enables the first DBMS to provide a resolved name list NL2 comprising mapped second table names to DBMS2 for enabling the second SP to execute in the requested computational task by using second tables specified in NL2 as input or output tables.

Thus, according to embodiments, the second DB-user is created in the DBMS at first for performing the DESCRIBE stored procedure in DBMS2. For this task, the second DB-user is created such that it lacks privileges to read or write data from any one of the second tables in DBMS2. Later, to enable the second DB-user to safely perform the second stored procedure, the user management module 140 specifically assigns privileges to the second DB-user in respect to the second tables to be used as input or output tables by the second stored procedure in accordance with the privilege information determined for the first DB-user for respective first tables. For example, in case the first user is allowed to read data from first table T1 and write data to first table T2, the first table T1 being mapped in the synchronization mapping to the second table T1' and T2 being mapped to the second table T2', then the second DB-user will have read permissions for table T1' and write permissions for table T2'. After having performed the second stored procedure, the second DB-user can be deleted automatically. In other embodiments (described later), different users are created for performing the second stored procedure (the "second DB-user") and for performing the DESCRIBE stored procedure (e.g. the "third DB-user" which in fact can be created in said embodiments before the second DB-user is created and which can be maintained for performing multiple DESCRIBE operations for different requests R).

A "first syntax" as used herein is a syntax for specifying table names and optionally other information proprietary or for other reasons usually not interpretable by a DBMS, in particular the first DBMS. Said "other information" could be specific to the processing of the second SP. For example, a request can be received by the first DBMS in which the names of first tables and their roles to act as input or output table are specified in a syntax being particular to the vendor of a set of second SPs. To the contrary, data provided in a "generic" syntax as used herein is data that can be interpreted and processed at least by the first DBMS or its components. Said components could e.g. be a linker module being an integral part of the first DBMS or being loaded into an already installed first DBMS for providing interoperability with the receiver module. Alternatively, said component could be the first SP. For example, a data provided in syntax may consist of a first data specifying first table names and views and/or UDFs specifically known to the DBMS1. In some embodiments, the syntax may also be interpretable by the second DBMS. For example, the DESCRIBE-SP or another vendor-specific SP can be applied for resolving view specifications and/or UDFs specifically known to the DBMS1 in a way that a statement is provided that functionally corresponds to said vies specification and/or UDF and that can be executed in the second DBMS.

According to embodiments, the second stored procedure is a third-party stored procedure provided and stored in the second DBMS after the second DBMS was installed and initiated on a computer.

According to other embodiments, different users can be used for performing the DESCRIBE stored procedure and the second stored procedure. For example, the second DBMS comprises a DESCRIBE stored procedure 148 which may have been installed after the initialization of the second DBMS and can be a non-trusted stored procedure. The system 102, e.g. the second user management module 140, is configured, in response to the receiving of the request by the first DBMS, to create a third DB-user 154 in the second DBMS. The third DB-user lacks permissions for accessing any one of the second tables. Alternatively, the second DBMS uses an existing DB-user as the third DB-user by withdrawing, in response to the receiving of the request by the first DBMS, all permissions for accessing any one of the second tables from said existing DB-user. For example, the second DBMS can be notified of the receiving of the request by the first DBMS via a receiver module 135. The third DB-user calls the DESCRIBE stored procedure 148, thereby providing the names of one or more first database tables to be used as input or output tables by the first stored procedure as input for the DESCRIBE-stored procedure. The provided first table names specify the names of all first database tables to be used as input or output tables in accordance with a first syntax. Then, the called DESCRIBE stored procedure parses the provided content for identifying the first tables acting as input or output tables of the first stored procedure. Then, the DESCRIBE stored procedure outputs a list of the identified first table names and their roles as input or output table in a syntax and transfers the list NL1 of the identified first table names and roles in syntax from the second DBMS to the first DBMS for enabling the first user management module 146 to identify the privilege information of the first DB-user in respect to the identified first tables by parsing the syntax. For example, the request R may comprise first table names NL which are specified in a syntax not interpretable by DBMS1, and the DESCRIBE stored procedure may transform said first syntax including the table names into a syntax interpretable by DBMS1 or one of its components (e.g. the linker module or the first SP). In addition, the second DBMS, e.g. the receiver module coupled to or being contained in the second DBMS, may directly or via the receiver module transfer information on the second tables mapped to the identified first tables in syntax to the first DBMS. Thus, the DBMS1 is informed in advance on the second tables to be accessed and optionally created in DBMS2 when performing the second stored procedure.

According to some embodiments, the third DB-user is created and deleted for each request to any first stored procedure of the first DBMS. This may increase the security and may improve the isolation of different requests of different client applications from each other. Alternatively, the third user is created once and used for providing the identified first table names in a syntax for multiple calls of the first stored procedure. This may increase performance as the consumption of computational resources associated with the creation and deletion of users is avoided. In some embodiments, one single DESCRIBE-SP is assigned to multiple first SPs and used for parsing requests R directed at said multiple first SPs.

In some embodiments, one DB-user for each DESCRIBE-SP is created in the DBMS comprising said DESCRIBE-SP, whereby the DB-user is only permitted to execute the DESCRIBE-SP on a request string R but may not access and database table or the database catalogue.

According to alternative embodiments, the first DBMS1 (instead of the second DBMS) comprises an installed DESCRIBE stored procedure. The DESCRIBE stored procedure is a non-trusted stored procedure (for example, a stored procedure provided by a party other than the vendor of the first DBMS. Typically, said party is the vendor of the second stored procedure for which the DESCRIBE-stored procedure shall be executed). A non-trusted stored procedure is a stored procedure which may have malicious, unsafe or erroneous code and whose execution in a database comprising confidential or sensitive data is considered as risky. The first DBMS, in particular the first user management module 146, is configured for creating, in response to the first DBMS receiving the request, a fourth DB-user in the first DBMS. The fourth DB-user lacks permissions for accessing any one of the first tables. Alternatively, the first DBMS uses an existing DB-user as the fourth DB-user by withdrawing, in response to the receiving of the request, all permissions for accessing any one of the first tables from said existing DB-user. The first DBMS calls, via the fourth DB-user, the DESCRIBE-stored procedure, thereby providing the names NL of one or more first database tables to be used as input or output tables by the first stored procedure as input for the DESCRIBE-stored procedure, the first table names being provided in accordance with a first syntax. The called DESCRIBE stored procedure parses the provided first table names for specifying the first tables acting as input or output tables of the first stored procedure in a syntax. Then, the called DESCRIBE stored procedure outputs a list NL1 of the identified first table names and their roles as input or output table in the syntax. The identification of the first user permissions is performed by the first DBMS (or its linker module or the first SP) by using the list NL1 of identified first table names in a syntax.

A benefit of using the DESCRIBE stored procedure is to allow the first DBMS to be notified in advance on the names of second tables to be used or created in the second DBMS upon executing the second stored procedure to ease updating the synchronization mapping, if necessary. However, the embodiments using a DESCRIBE stored procedure in the second DBMS have the advantage that a tight coupling between the first DBMS and the vendor of the second stored procedure(s) can be avoided. This is because the DESCRIBE stored procedure needs to know information on the second stored procedure (e.g. when and what kind of additional second tables are created for storing intermediate results when performing the second stored procedure) to be able to provide said information to the first DBMS before actually performing the second stored procedure. The second DBMS comprising the second stored procedure comprises information on the second stored procedure anyway, so implementing the DESCRIBE stored procedure in DBMS2 may prevent coupling the functionalities of DBMS1 to one or more vendors of various second stored procedures. For example, in case N different second stored procedures or stored procedure types of N respective vendors are contained in DBMS2, N different DESCRIBE stored procedures can be installed to provide the names of the second tables to be accessed or created by the second stored procedure in a syntax advance.

According to some embodiments, the fourth DB-user is created and deleted for each request to any first stored procedure of the first DBMS. This may increase the security and may improve the isolation of different requests of different client applications from each other. Alternatively, the fourth user is created once and used for providing the identified first table names in a syntax for multiple calls of the first stored procedure. This may increase performance as the consumption of computational resources associated with the creation and deletion of users is avoided.

According to embodiments, the second stored procedure is configured for triggering the execution of dynamic SQL statements. For example, it may comprise statements with parameter markers to be filled with arguments provided by the receiver module upon calling the second stored procedure. This can be advantageous as a highly flexible and fast data analysis environment is provided (the input tables comprising the data to be clustered can be specified at runtime by providing the table names as arguments) without risking that confidential data is stolen due to an SQL injection.

According to embodiments, the second user management module 140 causes the second stored procedure to access a second table only in case said second table is mapped—according to the synchronization mapping 138 (which is considered trustworthy)—to a first table the first DB-user has the appropriate access permissions.

According to embodiments, the second DBMS allows the execution of dynamic SQL statements under the control of the second user management module 140. Using an embodiment in a system whose second DBMS supports dynamic SQL statements is particular advantageous, because the dynamicity and flexibility of dynamic SQL is a security risk. By allowing the execution of dynamic SQL in the second DBMS, a flexible dispatching of computational tasks with a dynamically provided list of input table names is provided which nevertheless provides for a secure environment for performing the second stored procedures.

According to embodiments, the first DBMS is an Online-Transaction-Processing (OLTP) system and the second DBMS is an Online Analytical Processing (OLAP) system.

According to embodiments, the second DBMS is configured for returning the result of the execution of the second stored procedure to the first DBMS. The first DBMS is configured for forwarding the result of the execution of the second stored procedure to the client device 134 having submitted the request R. Thus, the client may receive the requested results more quickly, because the requested computational task was performed in the speed-optimized second DBMS, not in the first DBMS.

According to embodiments, the first stored procedure comprises a procedure body with a plurality of "parameter marker" (also referred to as "variables"). The parameter markers are to be filled with parameter values received as arguments upon a procedure call to the first stored procedure. The parameter values can be contained in the request R and indicate first table names. The context of the parameter markers in the body of the first stored procedure or information in the request R determine the role of a first table, i.e., if the first table acts as input or output table. This may provide for a particular flexible system where a client can freely and dynamically specify the tables and respective data to be analyzed.

For example, a first stored procedure may comprise the procedure signature SP1(<sp2-name>, <sp2-command>, <sp2-output>). This signature can be used for requesting the execution of various clustering algorithms according to:
Call SP1('NaiveBayes', 'sp2-commandNB', 'sp2-outputNB'). Upon executing the SP1 with said arguments, a NaiveBayes-specific SP2 can be called according to $SP2_{NB}$('sp2-commandNB', 'sp2-outputNB')
Call SP1(<KMEANS>, <sp2-commandKM>, <sp2-outputKM>). Upon executing the SP1 with said arguments, a KMeans-specific SP2 can be called according to $SP2_{KM}$('sp2-commandKM', 'sp2-outputKM')

In the above given examples, KMEANS and NaiveBayes might have different return types of the output. The "command" may or may not contain names of containers(tables or views) of DBMS1. The DESCRIBE-SP parses/interprets the "command" string and the "output" string for providing all relevant information in syntax.

According to embodiments, the second DBMS lacks the privilege information of the first DB-users. This can be beneficial as only the data, not also the privilege information are synchronized and transferred from the first to the second DBMS. Synchronizing all privilege information of the first DB-users with the privilege information of the second DBMS would result in the transfer of privilege information for a potentially huge number of database tables and frequent changes in the user permission in the first DBMS would require a similar frequent privilege synchronization process. Embodiments herein asynchronize privilege management between the first and second DBMS without having to regularly transfer all privilege information of first DB-users from the first to the second DBMS.

According to embodiments, the computational task is a data analysis or clustering algorithm that uses input data stored in a plurality of input tables and generates output data to be stored in one or more output tables.

According to embodiments, the method comprises storing the second stored procedure 116 in the second DBMS. The second stored procedure is configured for executing said computational task on second tables T1', T2', ..., T3' in the second DBMS. The type or structure of the second DBMS supports a faster execution of the computational task by the second stored procedure than the first stored procedure. The method further comprises replacing a legacy stored procedure 117 of the first DBMS by the first stored procedure 124. The legacy stored procedure is configured for executing the computational task on the first tables in the first DBMS. The first stored procedure has the same procedure name as the replaced legacy procedure. The first stored procedure triggers, in response to receiving a request R of a client device 134, the execution of the second stored procedure 116 for performing the computational task instead of performing the computational task itself According to other embodiments, the legacy SP 117 is not replaced but rather is rewritten as a wrapper stored procedure, which means 117 can't perform the computational task it is permanently or dynamically assigned to (e.g. a clustering algorithm) but rather is configured to act as a stub SP and as interface of the first SP 124 that dispatches the execution of the computational task to the second SP 116 of the second DBMS 128. The benefit is that the delegation of the computation of the computational task from DBMS1 to DBMS2 is transparent to a client and that the client can be enabled to request complex, analytical tasks from DBMS1 directly although the DBMS1 and its table structure may not be suited for performing said task, e.g. because they are optimized for OLTP processing.

According to some embodiments, the first stored procedure is manually or automatically created as a derivative of said legacy stored procedure, e.g. to provide the first stored procedure as a "wrapper stored procedure" for the legacy stored procedure which comprises only the list of first data containers accessed by and user-defined functions called by the legacy stored procedure. Thus, a convenient method for dispatching computational tasks from a first to a second DBMS is provided by creating a first stored procedure as a derivative of a legacy stored procedure and by using said first procedure as a wrapper for the legacy stored procedure. Using it as a wrapper may imply that when the first DBMS receives a request for executing the computational task, the first stored procedure assigned to said task is called instead of the legacy stored procedure.

This can be advantageous as a client does not have to "know" in which one of the DBMS a particular request has the minimum execution time and does not have to "know" if an analytical or OLTP-related request and corresponding statements should be directed to the first or to the second DBMS. Rather, any kind of request can be directed to the first DBMS which will dispatch the request to the DBMS2 in case for the requested first stored procedure a corresponding (e.g. mapped) second SP exists in the second DBMS. This may allow avoiding a tight coupling of client and database server and thus may reduce maintenance costs.

In a further beneficial aspect, an embodiment allow dispatching of a computational task from DBMS1 to DBMS2 even in case the table structures of the two DBMS vary, e.g. are row-oriented in DBMS1 and column-oriented in DBMS2, or in case a first table is mapped to and provides its data to two second tables, because the method body of the first and second SP may differ from each other to take into account different table structures.

According to some embodiments, the synchronization between the first and the second DBMS process is performed on a regular basis, e.g. once in an hour or one in a day. In addition, or alternatively, the synchronization process can be triggered by automatically thrown evens or in response to a user-action. A user may specify e.g. in a configuration file when and what kind of data of the first DBMS is transferred to the second DBMS. According to some embodiments, the first and the second DBMS respectively comprises an agent involved in a replication process: a source agent of the first DBMS may capture changes of the data in the first data containers (i.e., in the first DBMS) and transfers the captured changes to an apply agent of the second DBMS. According to embodiments, the synchronization table is stored in the first catalogue. In some embodiments, the synchronization process is controlled by a component of the first DBMS.

Figure 2:
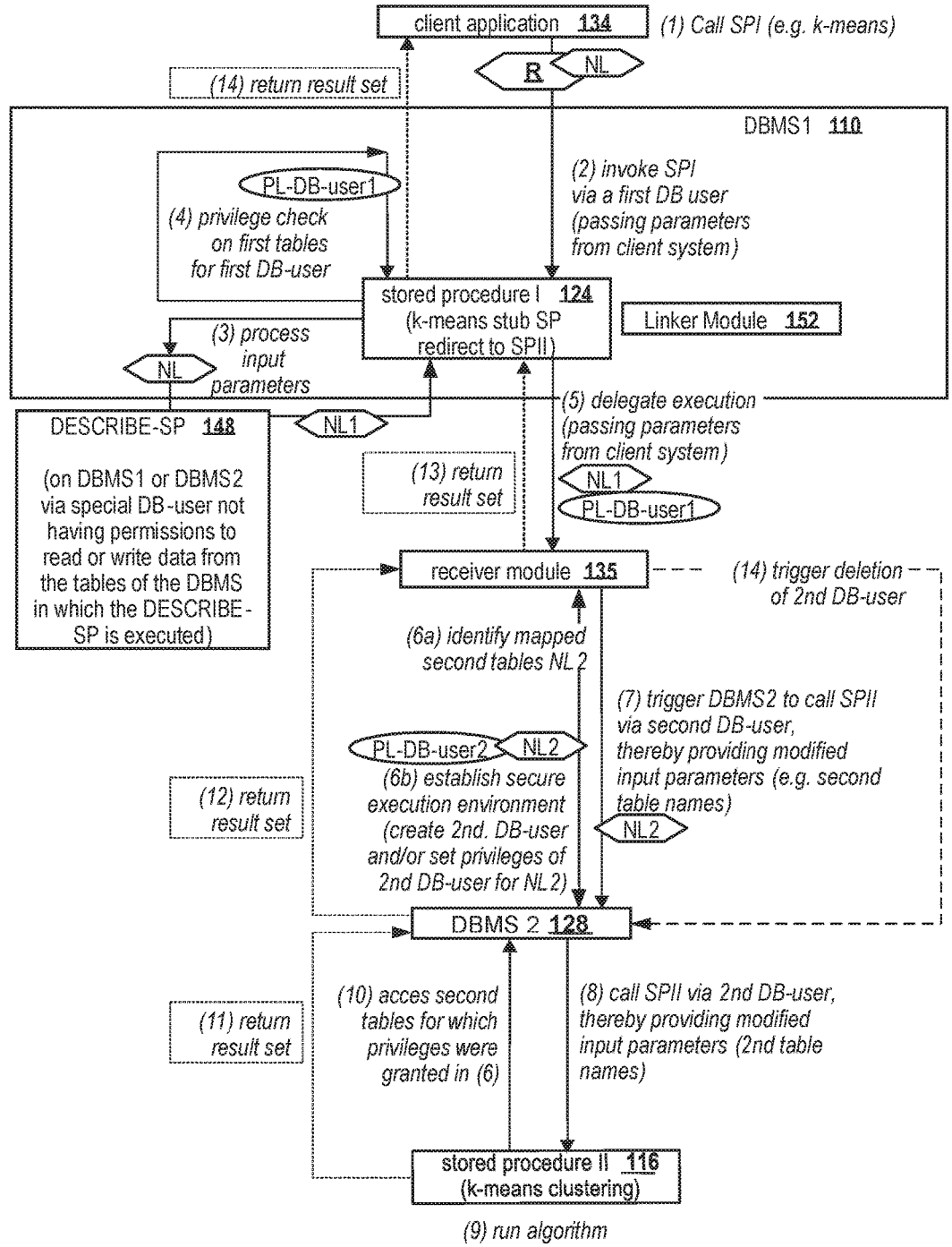
FIG. 2 depicts a process flow according to an embodiment.

FIG. 2 is a diagram illustrating the dispatching of the execution of a computational task such as K means clustering from a first 110 to a second DBMS 128. The first DBMS can be, for example, DB2 for z/OS and the second DBMS can be IBM Netezza Analytics Accelerator, but other implementations of the first and second DBMS can be used as well.

All data required for executing the computational task (and optionally further data) is copied from the first to the second DBMS. The data copying and maintenance process may not be implemented by the first stored procedure but can be performed by other stored procedures or modules. For example, a load utility provided by the second DBMS, e.g. a special form of SP such as IDAA's ACCEL_LOAD_TABLES stored procedure, can be used for regularly transferring data from the first to the second DBMS. Information from which first table(s) a particular second table in the second DBMS receives its data is stored in the synchronization mapping 138. The structure and names of the first and second tables may differ from each other.

The second DBMS 128 may comprise its own meta-data catalog including privilege information of DB-users managed by the second DBMS. Privilege information of first DB-users managed by the first DBMS is not mirrored completely (or not at all) to the second DBMS. This may have the advantage that user management and maintenance is simplified and computational resources and time are saved because synchronizing privilege information on many DB-users for a large number of different tables is computationally expensive.

A client application 134, running e.g. a client computer, at first sends a request R to the first DBMS 110. For example, the client may call the a first stored procedure 124 to initiate the execution of a computational task of performing a K-means clustering on a plurality of first input tables managed by the first DBMS 110. The names of the first tables acting as input tables and optionally one or more names of first tables acting as output tables can be provided in the form of a parameter list NL by the client application 134. In the depicted example, a linker module of the first DBMS, in response to receiving the request R, invokes the first procedure 124 via a first DB-user, thereby passing parameters NL, e.g. input and output table names of first tables acting as input or output tables as arguments to the first stored procedure 124. At least some of the parameters are already contained in the request R.

Instead of performing a K-means clustering, the first SP processes the input parameters for providing a supplemented parameter list NL1 which may comprise first table names NL specified by the client and optionally also some additional first table names specified e.g. within the first SP. The additional tables may comprise, for example, some configuration data needed for performing the requested K means clustering. According to embodiments, the parameter list NL1 comprising the first table names is provided in a syntax. This can be achieved by parsing the request R by a dedicated DESCRIBE SP running in the second DBMS or optionally also in the first DBMS.

In addition, the first SP triggers the user management module 146 of the first DBMS to perform a privilege check on all of the first tables specified in the parameter list NL1 in respect to a first DB-user.

The first stored procedure 124 delegates the execution of the requested computational task by passing parameters, e.g. the extended first table name list NL1 and the privilege information of the first DB-user in respect to said first tables to the second DBMS. For example, the first SP 124 may provide the name list NL1 and the privilege information PL-DB-user1 to a receiver module 135 being part of or operatively coupled to the second DBMS. The receiver module 135 interacts with the second DBMS, thereby causing a user management module 140 of the second DBMS to create a new second DB-user for each request resulting in a call to the second stored procedure or to remove all access privileges of an existing second DB-user for each of said requests. Thus, at first, this second DB is not allowed to view our access any of the second tables of the second DBMS. The second DBMS may receive the privilege information PL-DB-user1 of the first DB-user in respect to the first tables specified in parameter list NL1 from the receiver module. Then, the receiver module alone or in interoperation with the first or second DBMS identifies the names of the second tables mapped to the first tables specified in the parameter list NL1 in the synchronization mapping 138 (the receiver module can be an integral part of DBMS2 so this step may also be performed by DBMS2 alone). As a result, a resolved table name list NL2 is obtained which specifies the names of the second tables acting as input or output tables of the second stored procedure 116 configured to perform the requested computational task, e.g. the K means clustering algorithm.

The second DBMS creates a secure environment for executing the second stored procedure 116 by assigning the second DB-user, for each of the second tables specified in the parameter list NL2, the same privileges as are assigned to the first DB-user in respect to a first table mapped to said second table in the synchronization mapping 138. After the secure execution environment is established, the receiver module 135 call the second stored procedure 116 implementing the requested computational task (K means clustering) via the second DB-user. Thereby, a modified input parameter list comprising the resolved second table names is provided as input to the second SP 116.

The second SP 116 is executed, thereby reading data stored in a plurality of second tables identified by the parameter list NL2 as input tables. The results, e.g. a result set generated by the stored procedure 116, is returned via the second DBMS to the first DBMS 110 directly or via the second DBMS and the receiver module 135. Optionally, the result set may also be stored in one or more second tables specified by the parameter list NL2. Finally, the first DBMS returns the result that's to the client application 134. After having returned the result set to the first DMBS, the receiver module in some embodiments deletes the secure environment by triggering the deletion of the second DB-user.

Alternative implementations (not shown): according to embodiments, the processing of the input parameters of the client application in step (3) of FIG. 2 is handled in the first SP or the receiver module 135 exclusively. In this case, no security exposure will occur (assuming a correct implementation of the first SP and the receiver module 135 which usually can be relied on; for example, the receiver module can be an integral part of the second DBMS or a plugin provided by a trusted vendor). However, if, according to other embodiments, the parsing of the first table names is delegated to another SP, e.g. the "DESCRIBE" SP used in an embodiment for parsing the parameter list derived from the body of the first SP and the client parameter list NL, there is the risk that the DESCRIBE SP comprises erroneous or malicious code. For example, the DESCRIBE stored procedure can be provided by a particular vendor and can be used for parsing the parameter list to be used for a plurality of different second stored procedures also provided by said vendor. Therefore, the DESCRIBE SP is executed also in a secure environment provided for example, as described above, e.g. by the second DB-user or a different, e.g. "third"-DB-user. For example, the receiver module may trigger the creation of the second DB-user (or another DB-user) in the second DBMS right away in response to being notified that the first SP was called by a client application. This DB-user has no privileges to access any table in the second DBMS. In step (3) of FIG. 2, the DESRIBE SP is executed via this DB-user not being allowed to access any table in the second DBMS. This is not necessary as the DESCRIBE SP acts as a syntax parser for transforming various parameter values of the request R, e.g. specifications of input and output tables and/or an ID of the requested computational task, into statements that can be interpreted at least by the first DBMS. The DB-user performing the DESCRIBE-SP has the necessary privileges to allow the DESCRIBE-SP to execute the DESCRIBE-SP but lacks any privileges for read- or write access to any payload data in the tables of the DBMS comprising the DESCRIBE-SP and is not allowed to access the catalogue of the DBMS it is executed in. After having executed the DESCRIBE SP in the second DBMS by the second DB-user not being allowed to access any one of the second tables, the list of first table names is returned from the second DBMS to the first DBMS and step 3 of FIG. 2 is completed. Afterwards, the receiver module may trigger the DBMS2 to grant the second DB-user access to all second tables that are mapped in the synchronization mapping to the input and output tables indicated in the name list NL1 and for which the first DB-user has assigned access privileges (e.g. table- or view specific permissions for performing a SELECT, INSERT, UPDATE and/or DELETE operation). Then, the second DB-user executes the second SP. In other embodiments, different DB-users for performing the DESCRIBE SP and the second SP are created, whereby the DB-user for performing the DESCRIBE SP is not allowed to access any of the second tables and wherein the privileges of the DB-user for performing the second SP depends on the privileges of the first DB-user as described above. Delegating the syntax parsing step to one central SP located in the second DBMS can be advantageous as different packages of SPs can be provided by different vendors or for different analytical tasks and in each package, the input and output tables can be specified in a different syntax.

A "system" or "data management system" as used herein is a data processing system comprising at least a first DBMS and one or more second DBMS, whereby at least a fraction of the data of the first DBMS is transferred to the one or more second DBMS for synchronizing said data fraction of the first DBMS with the data of the second DBMS(s). In some embodiments, the first DBMS is speed-optimized for other types of queries than the second DBMS(s). For example, the first DBMS can be an OLTP system and the second DBMS (s) can be an OLAP system. For example, the first DBMS can be DB2 for z/OS and at least one second DBMS could be, for example, the "analytics accelerator" for DB2. In some embodiments, the first and second DBMS are of the same type, e.g. an OLTP database management system (DBMS), and OLAP DBMS, a graph based DBMS, a triple store, a columnar DBMS or the like. In other embodiments, they are of a different type. For example, the first DBMS could be a row-oriented DBMS and the second DBMS could be a column-oriented DBMS. In some embodiments the first and/or second DBMMs are implemented as in-memory DBMSs. The data management system can be a federated DBMS system wherein at least a fraction of the data of the first DBMS is transferred to the one or more second DBMS. In some embodiments, the first DBMS is not able to access the second catalogue of any one of the second DBMS and no second DBMS is able to access the first catalogue of the first DBMS. The first and second DBMS have different user management modules respectively responsible for creating, managing and deleting users and their respective privileges.

The first and second DBMS can be hosted on the same data processing machine or on different data processing machines connected to each other via a network. In this case, the data management system can be implemented in the form of a distributed system, e.g. a distributed federated DBMS.

According to some embodiments, the second DBMS lacks an interface for receiving requests from the client application and the first DBMS is configured to receive the request of the client application via an interface of the data management system. Thus, the combination of the first and second DBMS or a combination of the first and multiple second DBMS may appear to the client as a single monolithic DBMS comprising a single interface for receiving requests. However, "under the hood", said system may comprise two different database management systems with respective user management modules whose data is at least partially synchronized. Such a "combined" DBMS can be capable of processing a request faster than a DBMS comprising only a single DBMS-core.

The first and/or the second DBMS can be, for example, an OLAP-DBMS, an OLTP-DBMS, a graph-based DBMS, a triplestore-DBMS, a key-value ("correlation")-DBMS, a document-based DBMS, a row-oriented DBMS, a column-oriented DBMS and the second DBMM could be any other one of said DBMS-types. A "column oriented"-DBMS is a DBMS that stores data tables as sections of columns of data rather than as rows of data by serializing all of the values of a column together, then the values of the next column. A "row oriented"-DBMS is a DBMS that stores data tables as sections of rows of data rather than as columns of data by serializing all of the values of a row together, then the values of the next row.

The first and/or second DBMS can be, for example, DB2, Oracle, MySQL or the like whose functionality can be extended by installing appropriate plug-ins and extension modules. The second DBMS can be, for example, an accelerator, e.g. Netezza.

The first DBMS is configured for managing first data containers being organized in accordance with a first storage format, e.g. a row-store format, and each of the one or more second DBMS is configured for managing second data containers, the second data containers being organized in accordance with a different, second storage format, e.g. a column-store data format. For example, all or most of the first tables could be organized in row-major order and all or most of the second tables could be organized in column-major order. The first DBMS is configured for computing efficient query execution plans for tables in row-major order and the second DBMS is configured for computing efficient query execution plans for tables in column-major order. Row-major order and column-major order describe methods for arranging multidimensional arrays in linear storage such as memory. In row-major order, consecutive elements of the rows of the array are contiguous in memory. In column-major order, consecutive elements of the columns are contiguous. Array layout is important for performance when traversing an array because accessing array elements that are contiguous in memory is usually faster than accessing elements which are not, due to caching.

An "accelerator system" or "accelerator" as used herein is a DBMS designed to allow the querying of data in a particularly fast manner. An accelerator system can be a conventional DBMS coupled to another DBMS or can be a module or plug-in that needs to be operatively coupled to another (the "first") DBMS to be operable to function, e.g., to analyze data. Said module or plug-in may not be usable on its own. When coupled to the other DBMS, e.g. a "first DBMS", the accelerator system is configured to act as an "accelerator" of the first DBMS, because it is capable of processing at least some kinds of database queries faster than the first DBMS.

A "database management system" (DBMS) is an application designed to allow the definition, creation, querying, update, and administration of databases having one or more different storage formats. A DBMS as used herein is an application. It is a self-contained executable that can be saved to a customer's computer and launched directly, or is a set of one or more executables that needs to be installed before it can be launched. A DBMS as used herein comprises its own functional module for managing DB-users of said DBMS and respective permissions to access tables and/or views managed by said DBMS.

A storage format defines the manner how data stored in and managed by the DBMS is stored. Examples for storage formats are "column-major" and "row-major" storage format.

A "database" as used herein is an information structure which comprises one or more data containers, e.g. tables and views, whereby the use of said data containers is controlled by a DBMS. Said "use" may comprise, for example, reading data from a data container, storing data in a data container, manipulating or evaluating the structure of a data container or planning query execution on multiple ones of said data containers. The database can be a relational database, an object oriented database, or any other kind of database. Accordingly, the DBMS can be a relational DBMS, an object oriented DBMS, an OLAP DBMS, an OLTP DBMS, or any other kind of DBMS.

A "catalogue" or "database catalogue" as used herein is a component of a database management module that comprises metadata in which definitions of database objects such as data containers such as base tables and views, synonyms, value ranges, indexes, users, user groups, user- and group-specific permissions, stored procedures and/or user defined functions are stored. According to an embodiment, the catalogue is accessible by a uniform SQL standard called the INFORMATION SCHEMA, but there exist also database-specific metadata access methods, e.g. for Oracle databases. A catalog can be specific for data containers of a particular storage format.

A "stored procedure" as used herein is a subroutine available to applications that access a DBMS. A stored procedure ("SP") is typically stored in the catalogue of a DBMS. Stored procedures can be used for data validation and/or data analysis integrated into a DBMS. They can consolidate and centralize logic that was originally implemented in applications, thereby increasing performance by avoiding data traffic between the DBMS and an external application and by making use of performance-optimized database operations. Stored procedures may return result sets, may contain declared variables for processing data and cursors that allow it to loop through multiple rows in a table. The exact and correct implementation of stored procedures varies from one database system to the other. Most major database vendors support them in some form. Depending on the database system, stored procedures can be implemented in a variety of programming languages, for example SQL, Java, C, or C++. Stored procedures written in non-SQL programming languages may or may not execute SQL statements themselves.

A stored procedure may comprise or be implemented as a user defined function (UDF). For example, the second stored procedure in the second DBMS may comprise or consist of a particular UDF whose specification is completely implemented in plain SQL text. Alternatively, the second stored procedure is or comprises a reference to a module having implemented the UDF. Said module may have been installed or loaded to the DBMS2. Said module can be, for example, a Java, C++ or C# module.

A "computational task" is a computational process designed to provide a particular result. For example, a computational task could be an analytical task, e.g. a clustering algorithm such as k-means, native Bayes, k-nearest neighbors, simple linear regression, multiple regression, logistic regression, decision trees, neural networks, and the like. It can also be a simulation or modeling task or any other form of data processing operation. The performing of a computational task may involve reading data from a plurality of tables and/or views and may involve the creation of intermediate results.

A "synchronization mapping" as used herein is a mapping between first tables of a first DBMS and second tables of a second DBMS. The data content of at least some of the first tables is transferred to and thus synchronized with one or more specific second tables. The synchronization mapping specifies which ones of the second tables receive data from which ones of the first tables. In the synchronization mapping, each of the synchronized first tables has assigned one or more second tables whose data content is synchronized with the data content of said first table.

A "query" as used herein is a read request for information from a database and/or a write request for storing data in said database. A query can comprise a SELECT, UPDATE, INSERT or DELETE statement or any combination thereof. For example, multiple SQL statements can be combined in a complex manner via JOIN clauses.

A "schema definition" as used herein is the definition of the structure of a database table or view, the definition being provided in a formal language supported by the DBMS managing said tables or views. In a relational database, a schema definition specifies the table name, the columns contained therein and the relationships between columns and tables.

A "DESCRIBE" stored procedure as used herein is a stored procedure executed in a particular DBMS that is configured for resolving Strings of a particular first syntax that cannot be interpreted and executed by said particular DBMS into a syntax that can be interpreted by said particular DBMS. For example, said String can be provided by a request of a client application for a computational task and may specify roles "input table", "output table", or a name or ID of the requested computational task which may not immediately be interpretable by the first DBMS. The DESCRIBE-SP can be provided, for example, by the same vendor having provided the first and second SP and can be configured for parsing the request string and return the parameter values contained therein to the first DBMS in a syntax than can be interpreted at least by the first DBMS. A non-trusted DESCRIBE-SP is an SP considered as not trustworthy, e.g. because it is provided by a third party, e.g. the vendor of the first and/or second SPs. A non-trusted DESCRIBE-SP can be a DESCRIBE-SP for which the provider of the first or second DBMS cannot provide any guarantee that the code of the DESCRIBE-SP is free of bugs, free of malicious code and free of exploitable security gaps.

In view of the above, system comprising a synchronization mapping, a first DBMS and a second DBMS, the first DBMS comprising a first database with a plurality of first tables, a first user management module for managing and checking privileges of DB-users of the first DBMS, and at least one first stored procedure; the second DBMS comprising a second database with a plurality of second tables, a second user management module for managing and checking privileges of DB-users of the second DBMS, and at least one second stored procedure, the second stored procedure configured for performing a computational task in the second DBMS, the synchronization-mapping mapping at least some of the first tables to respective ones of the second tables, the system being configured for transferring data of at least some of the first tables to respective ones of the second tables in accordance with the synchronization-mapping; the system being configured for: receiving, by the first DBMS, a request for performing the computational task from a client application, the request being a request of a first DB-user of the first DBMS; identifying, in response to receiving the request, one or more of the first tables to act as input or output tables for the first stored procedure; determining, by the first user management module, for each of the identified first tables, if the first DB-user has read or write permissions for said first table for generating privilege information of the first DB-user; granting, by the second DBMS, user privileges to a second DB-user in respect to second tables mapped in the synchronization mapping to the identified first tables, the user privileges being granted in accordance with the privilege information of the first DB-user; executing, by the second DBMS via the second DB-user, the second stored procedure, whereby the second user management module prohibits access to any one of the second tables for which the second DB-user lacks the necessary privileges.

The system of claim 1, the method further comprising: communicating the determined privilege information of the first DB-user to the second DBMS; identifying one or more of the second tables mapped in the synchronization mapping to one of the identified first tables, the identified second tables acting as input or output tables for the second stored procedure; in response to receiving the privilege information, creating, by the second user management module, the second DB-user as a user of the second DBMS; the specification of the user privileges of the second DB-user comprising: assigning, by the second user management module, to the second DB-user the same access privileges for each of the identified second tables which are granted to the first DB-user in respect to one of the identified first tables to which said second table is mapped in the synchronization-mapping.

The system of claim 1, the second DBMS being configured for automatically deleting the second DB-user upon aborting or successfully terminating the execution of the second stored procedure.

The system according to claim 1, the access privileges assigned to the second DB-user in respect to any one of the identified second tables being confined to SELECT-privileges in case the access privileges of the first DB-user in respect to the one of the first tables to which said identified second table is mapped in the synchronization-mapping is confined to SELECT privileges.

The system according to claim 1, the second DBMS being configured for allowing only the first DBMS to trigger the execution of the second stored procedure.

The system according to claim 1, the second user management module of the second DBMS not having access to the user privilege information of the first DB-user unless the privilege information of the first user is communicated by the first DBMS to the second DBMS in response to the first DBMS receiving the request from the client application.

The system according to claim 1, the names of the identified first database tables acting as input or output table of the first stored procedure being: specified in the request as parameter values to be used as input parameters for the first procedure; and/or specified in the code of the first procedure.

The system according to claim 2, the system being configured for performing a method comprising: installing a DESCRIBE stored procedure in the second DBMS, the DESCRIBE stored procedure being a non-trusted stored procedure; performing the creation of the second DB-user in the second DBMS, the created second DB-user lacking permissions for accessing any one of the second tables but being allowed to call a DESCRIBE-stored procedure of the second DBMS; calling, by the second DB-user, the DESCRIBE-stored-procedure, thereby providing parameter values of the request as input for the DESCRIBE-stored procedure; parsing, by the called DESCRIBE procedure, the provided parameter values for identifying the first tables acting as input or output tables of the first stored procedure; and outputting a list of the identified first table names and their roles as input or output table in a generic syntax; transferring the list of the identified first table names and roles in the generic syntax from the second DBMS to the first DBMS for enabling the first DBMS or the first stored procedure to identify the privilege information of the first DB-user in respect to the identified first tables by parsing the generic syntax.

The system according to claim 1, the system being configured for performing a method comprising: installing a DESCRIBE stored procedure in the second DBMS, the DESCRIBE stored procedure being a non-trusted stored procedure; in response to receiving the request by the first DBMS, creating, by the second DBMS, a third DB-user in the second DBMS, the third DB-user lacking permissions for accessing any one of the second tables, or using an existing DB-user as the third DB-user by withdrawing all permissions for accessing any one of the second tables from said existing DB-user; calling, by the third DB-user, the DESCRIBE-stored procedure, thereby providing parameter values of the request as input for the DESCRIBE-stored procedure; parsing, by the called DESCRIBE procedure, the provided parameter values for identifying the first tables acting as input or output tables of the first stored procedure; and outputting a list of the identified first table names and their roles as input or output table in a generic syntax; transferring the list of the identified first table names and roles in the generic syntax from the second DBMS to the first DBMS for enabling the first DBMS or the first stored procedure to identify the privilege information of the first DB-user in respect to the identified first tables by parsing the generic syntax.

The system according to claim 1, the system being configured for performing a method comprising: installing a DESCRIBE stored procedure in the first DBMS, the DESCRIBE stored procedure being a non-trusted stored procedure; in response to receiving the request by the first DBMS, creating a fourth DB-user in the second DBMS, the fourth DB-user lacking permissions for accessing any one of the first tables, or using an existing DB-user as the fourth DB-user by withdrawing all permissions for accessing any one of the first tables from said existing DB-user; calling, by the fourth DB-user, the DESCRIBE-stored procedure, thereby providing parameter values of the request as input for the DESCRIBE-stored procedure; parsing, by the called DESCRIBE procedure, the provided parameter values for identifying the first tables acting as input or output tables of the first stored procedure; and outputting a list of the identified first table names and their roles as input or output table in a generic syntax.

The system according to claim 1, the second stored procedure being configured for triggering the execution of dynamic SQL statements.

The system according to claim 1, the second DBMS lacking an interface for receiving requests from the client application, the first DBMS being configured to receive the request of the client application via an interface of the data management system.

The system according to claim 1, the second DBMS being configured for returning the result of the execution of the second stored procedure to the first DBMS; the first DBMS being configured for forwarding the result of the execution of the second stored procedure to the client device having submitted the request.

The system according to claim 1, the first stored procedure comprising a procedure body with a plurality of parameter markers, whereby the parameter markers are to be filled with parameter values contained in the request, the parameter values indicating first table names, the context of the parameter markers in the body of the first stored procedure or information in the request determining a role of a table to act as input and/or output table for the first procedure.

The system according to claim 1, the second stored procedure being one of: a user defined function executable in the second DBMS; a stored procedure whose code comprises a call to a user defined function executable in the second DBMS; a stored procedure whose code comprises a call to a program logic external to the second DBMS but being callable by the second DBMS.

The system according to claim 1, the second DBMS being operatively coupled to a receiver module, the receiver module being an integral part of the second DBMS or being a plugin of the second DBMS, the receiver module being configured for receiving the privilege information of the first DB-user and being configure for, in response to receiving a list of names of the one or more first tables identified as input or output tables for the computational task: triggering the second DBMS to grant the user privileges of the second DB-user in accordance with the received privilege information of the first DB-user; and/or performing the identification of the one or more of the second tables mapped in the synchronization mapping to the identified first tables or triggering the first or second DBMS to perform said identification of the one or more second tables mapped in the synchronization mapping to the identified first tables; and/or triggering the second DBMS execute the second stored procedure via the second DB-user.

A computer-implemented method for secure invocation of stored procedures, the method being implemented and performed in a system comprising a synchronization mapping, a first DBMS and a second DBMS, the first DBMS comprising a first database with a plurality of first tables, a first user management module for managing and checking privileges of DB-users of the first DBMS, and at least one first stored procedure; the second DBMS comprising a second database with a plurality of second tables, a second user management module for managing and checking privileges of DB-users of the second DBMS, and at least one second stored procedure, the second stored procedure configured for performing a computational task in the second DBMS, the method comprising: transferring data of at least some of the first tables to respective ones of the second tables in accordance with the synchronization-mapping, the synchronization-mapping mapping at least some of the first tables to respective ones of the second tables; receiving, by the first DBMS, a request for performing the computational task from a client application, the request being a request of a first DB-user of the first DBMS; identifying one or more of the first tables to act as input or output tables for the first stored procedure; determining, by the first user management module, for each of the identified first tables, if the first DB-user has read or write permissions for said first table for generating privilege information of the first DB-user; granting, by the second DBMS, user privileges to a second DB-user in respect to second tables mapped in the synchronization mapping to the identified first tables, the user privileges being granted in accordance with the privilege information of the first DB-user; executing, by the second DBMS via the second DB-user, the second stored procedure, whereby the second user management module prohibits access to any one of the second tables for which the second DB-user lacks the necessary privileges.

The method of claim 17, the method comprising: storing the second stored procedure in the second DBMS, the second stored procedure configured for executing said computational task on second tables in the second DBMS, replacing a legacy stored procedure of the first DBMS by the first stored procedure, the legacy stored procedure being configured for executing the computational task on the first tables in the first DBMS, the first stored procedure having the same procedure name as the replaced legacy procedure, the first stored procedure triggering, in response to receiving a request of a client device, the execution of the second stored procedure for performing the computational task instead of performing the computational task itself A computer program product for secure invocation of stored procedures, the computer program product comprising a computer readable storage medium having program instructions embodied therewith, the program instructions executable by a processor to cause the processor to execute the method according to claim 17

Embodiments herein can be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments.

Aspects of embodiments are described herein with reference to flowchart illustrations and/or block diagrams of methods, apparatus (systems), and computer program products according to an embodiment. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A system, comprising:
a first database management system (DBMS) comprising:
 a processor,
 a memory,
 a first database with a plurality of first tables,
 a first user management module configured to manage and check privileges of database users (DB-users) of the first DBMS, and
 at least one first stored procedure;
a second DBMS comprising:
 a second database with a plurality of second tables,
 a second user management module configured to manage and check privileges of DB-users of the second DBMS, and
 at least one second stored procedure,
 the at least one second stored procedure configured to perform a computational task in the second DBMS; and
a synchronization mapping configured to map at least a portion of the first tables to respective ones of the second tables, the system being configured for transferring data of at least some of the first tables to the respective ones of the second tables in accordance with the synchronization-mapping,
wherein names of the one or more of the plurality of first tables acting as the input or output tables of the at least one first stored procedure are specified in a request as parameter values to be used as input parameters for the at least one first stored procedure or specified in the code of the at least one first stored procedure,
wherein the system is configured to:
 install a describe stored procedure in the second DBMS, the describe stored procedure being a non-trusted stored procedure;
 create the second DB-user in the second DBMS, the second DB-user not having access to any one of the second tables and being permitted to call the describe stored procedure;
 call the describe stored procedure to provide parameter values of the request as input for the describe stored procedure;
 parse, via the describe stored procedure, the provided parameter values;
 output a list of the identified first table names and corresponding roles as an input or output table in a generic syntax; and
 transfer the list and the corresponding roles from the second DBMS to the first DBMS to enable the first DBMS or the at least one first stored procedure to identify the privilege information of the first DB-user with respect to the one or more of the plurality of first tables.

2. The system according to claim 1, wherein the system is configured to:
 receive a request for performing the computational task from a client application, the request being a request of a first DB-user of the first DBMS;
 identify, in response to receiving the request for performing the computational task, one or more of the plurality of first tables to act as input or output tables for the first stored procedure;
 determine, for each of the one or more of the plurality of first tables, if the first DB-user has read or write permissions for said one or more of the plurality of first tables for generating privilege information of the first DB-user;
 grant user privileges to a second DB-user with respect to the respective ones of the second tables mapped by the synchronization mapping to the at least a portion of the plurality of first tables, the user privileges being granted in accordance with the privilege information of the first DB-user; and
 execute the at least one second stored procedure to prohibit access to any one of the second tables for which the second DB-user lacks privileges.

3. The system of claim 1, wherein the system is configured to:

communicate the privilege information of the first DB-user to the second DBMS;

identify one or more of the second tables mapped in the synchronization mapping to the one or more of the plurality of first tables, the one or more of the second tables acting as input or output tables for the at least one second stored procedure;

in response to receiving the privilege information, creating a second DB-user as a user of the second DBMS;

wherein a specification of the privileges of the second DB-user comprises:

assigning to the second DB-user same access privileges for each of the one or more of the second tables that are granted to the first DB-user with respect to one of the first tables to which said second table is mapped.

4. The system according to claim 1, the second DBMS being configured to automatically delete a second DB-user upon aborting or successfully terminating the execution of the at least one second stored procedure.

5. The system according to claim 3, wherein the access privileges assigned to the second DB-user are confined to select-privileges when the access privileges of the first DB-user are confined to select-privileges.

6. The system according to claim 1, wherein the second DBMS is configured to allow the first DBMS to trigger an execution of the at least one second stored procedure.

7. The system according to claim 1, wherein the second user management module of the second DBMS is granted access to the user privilege information of the first DB-user when the privilege information of the first user is communicated by the first DBMS to the second DBMS.

8. The system according to claim 1, wherein the system is configured to:

in response to receiving a request by the first DBMS, create a third DB-user in the second DBMS or utilizing an existing DB-user as the third DB-user by withdrawing all permissions for accessing any one of the second tables from said existing DB-user, the third DB-user not having access to any one of the second tables;

call the describe stored procedure to provide parameter values of the request as input for the describe stored procedure;

parse, via the describe stored procedure, the provided parameter values;

output a list of the identified first table names and corresponding roles as an input or output table in a generic syntax; and transfer the list and the corresponding roles from the second DBMS to the first DBMS to enable the first DBMS or the at least one first stored procedure to identify the privilege information of the first DB-user with respect to the one or more of the plurality of first tables.

9. The system according to claim 1, wherein the system is configured to:

in response to receiving a request by the first DBMS, create a third DB-user in the second DBMS or using an existing DB-user as the third DB-user by withdrawing all permissions for accessing any one of the first tables from said existing DB-user, the third DB-user not having access to any one of the second tables;

call the describe stored procedure to provide parameter values of the request as input for the describe stored procedure;

parse, via the describe stored procedure, the provided parameter values;

output a list of the identified first table names and corresponding roles as an input or output table in a generic syntax.

10. The system according to claim 1, wherein the at least one second stored procedure is configured to trigger an execution of dynamic structured query language statements.

11. The system according to claim 1, wherein the first DBMS is configured to receive a request of the client application via an interface of the first DBMS.

12. The system according to claim 1, wherein the second DBMS is configured to return a result of an execution of the at least one second stored procedure to the first DBMS; and wherein the first DBMS being configured for forwarding the result of the execution of the at least one second stored procedure to the client device having submitted the request.

13. The system according to claim 1, wherein the at least one first stored procedure comprises a procedure body with a plurality of parameter markers, wherein the plurality of parameter markers configured to be filled with parameter values contained in the request, wherein the parameter values indicating first table names.

14. The system according to claim 1, wherein the at least one second stored procedure is:

a user defined function executable in the second DBMS;

a stored procedure comprising code to a call to a user defined function executable in the second DBMS; or a stored procedure comprising code to a call to a program logic external to the second DBMS and to be called by the second DBMS.

15. The system according to claim 1, wherein the second DBMS is operatively coupled to a receiver module, wherein the receiver module is a part of the second DBMS or is a plugin of the second DBMS, wherein the receiver module is configured to;

receive the privilege information of the first DB-user, and in response to receiving a list of names of the one or more first tables identified as input or output tables for the computational task, trigger the second DBMS to grant the user privileges of the second DB-user in accordance with the privilege information of the first DB-user;

perform the identification of the one or more of the second tables mapped in the synchronization mapping to the identified first tables or triggering the first or second DBMS to perform said identification of the one or more second tables mapped in the synchronization mapping to the identified first tables; and trigger the second DBMS execute the second stored procedure via the second DB-user.

16. A processor-implemented method for secure invocation of stored procedures, the processor-implemented method comprising:

receiving, by a processor coupled to a memory, a request for performing a computational task from a client application, the request being a request of a first DB-user of a first DBMS;

identifying, by the processor, in response to receiving the request for performing the computational task, one or more of a plurality of first tables to act as input or output tables for a first stored procedure;

determining, by the processor, for each of the one or more of the plurality of first tables, if the first DB-user has read or write permissions for said one or more of the plurality of first tables for generating privilege information of the first DB-user;

granting, by the processor, user privileges to a second DB-user with respect to respective ones of second tables mapped by a synchronization mapping to at least a portion of the plurality of first tables, the user privileges being granted in accordance with the privilege information of the first DB-user;

executing, by the processor, the at least one second stored procedure to prohibit access to any one of the second tables for which a second DB-user lacks privileges;

installing, by the processor, a describe stored procedure in the second DBMS, the describe stored procedure being a non-trusted stored procedure;

creating, by the processor, the second DB-user in the second DBMS, the second DB-user not having access to any one of the second tables and being permitted to call the describe stored procedure;

calling, by the processor, the describe stored procedure to provide parameter values of the request as input for the describe stored procedure;

parsing, by the processor via the describe stored procedure, the provided parameter values;

outputting, by the processor, a list of the identified first table names and corresponding roles as an input or output table in a generic syntax; and transferring, by the processor, the list and the corresponding roles from the second DBMS to the first DBMS to enable the first DBMS or the at least one first stored procedure to identify the privilege information of the first DB-user with respect to the one or more of the plurality of first tables.

17. The processor-implemented method according to claim 16, the processor-implemented method comprising:

storing the second stored procedure in the second DBMS, the second stored procedure configured to execute said computational task on the second tables in the second DBMS, and replacing a legacy stored procedure of the first DBMS by the first stored procedure.

18. The processor-implemented method according to claim 16, the processor-implemented method comprising:

receiving a request for performing the computational task from a client application, the request being a request of a first DB-user of the first DBMS;

identifying, in response to receiving the request for performing the computational task, one or more of the plurality of first tables to act as input or output tables for the first stored procedure;

determining, for each of the one or more of the plurality of first tables, if the first DB-user has read or write permissions for said one or more of the plurality of first tables for generating privilege information of the first DB-user;

granting user privileges to a second DB-user with respect to the respective ones of the second tables mapped by the synchronization mapping to the at least a portion of the plurality of first tables, the user privileges being granted in accordance with the privilege information of the first DB-user; and executing the at least one second stored procedure to prohibit access to any one of the second tables for which the second DB-user lacks privileges.

19. A computer program product, the computer program product comprising a computer readable storage medium having program instructions for secure invocation of stored procedures embodied therewith, the program instructions executable by a processor to cause the processor to perform:

receiving a request for performing a computational task from a client application, the request being a request of a first DB-user of a first DBMS;

identifying in response to receiving the request for performing the computational task, one or more of a plurality of first tables to act as input or output tables for a first stored procedure;

determining for each of the one or more of the plurality of first tables, if the first DB-user has read or write permissions for said one or more of the plurality of first tables for generating privilege information of the first DB-user;

granting, user privileges to a second DB-user with respect to respective ones of second tables mapped by a synchronization mapping to at least a portion of the plurality of first tables, the user privileges being granted in accordance with the privilege information of the first DB-user;

executing the at least one second stored procedure to prohibit access to any one of the second tables for which a second DB-user lacks privileges;

installing a describe stored procedure in the second DBMS, the describe stored procedure being a non-trusted stored procedure;

creating the second DB-user in the second DBMS, the second DB-user not having access to any one of the second tables and being permitted to call the describe stored procedure;

calling the describe stored procedure to provide parameter values of the request as input for the describe stored procedure;

parsing, via the describe stored procedure, the provided parameter values;

outputting a list of the identified first table names and corresponding roles as an input or output table in a generic syntax; and transferring the list and the corresponding roles from the second DBMS to the first DBMS to enable the first DBMS or the at least one first stored procedure to identify the privilege information of the first DB-user with respect to the one or more of the plurality of first tables.

20. The computer program product according to claim 19, wherein the program instructions executable by the processor to cause the processor to:

receive a request for performing the computational task from a client application, the request being a request of a first DB-user of the first DBMS;

identify, in response to receiving the request for performing the computational task, one or more of the plurality of first tables to act as input or output tables for the first stored procedure;

determine, for each of the one or more of the plurality of first tables, if the first DB-user has read or write permissions for said one or more of the plurality of first tables for generating privilege information of the first DB-user;

grant user privileges to a second DB-user with respect to the respective ones of the second tables mapped by the synchronization mapping to the at least a portion of the plurality of first tables, the user privileges being granted in accordance with the privilege information of the first DB-user; and execute the at least one second stored procedure to prohibit access to any one of the second tables for which the second DB-user lacks privileges.

* * * * *